July 22, 1947. J. C. NILSSON 2,424,497
BORE GAUGE
Filed Nov. 19, 1945
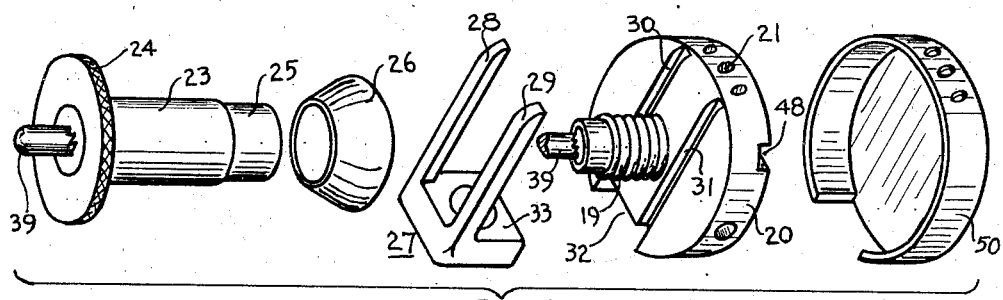
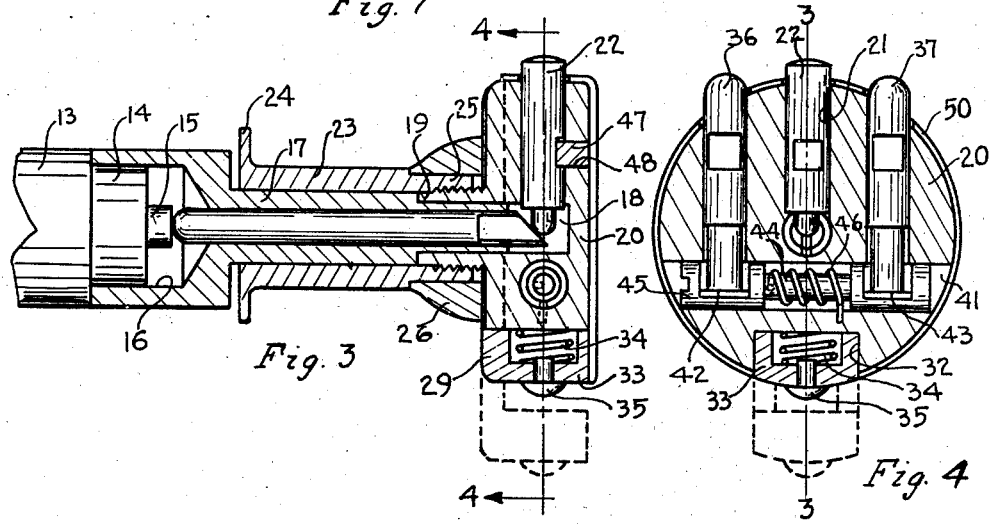
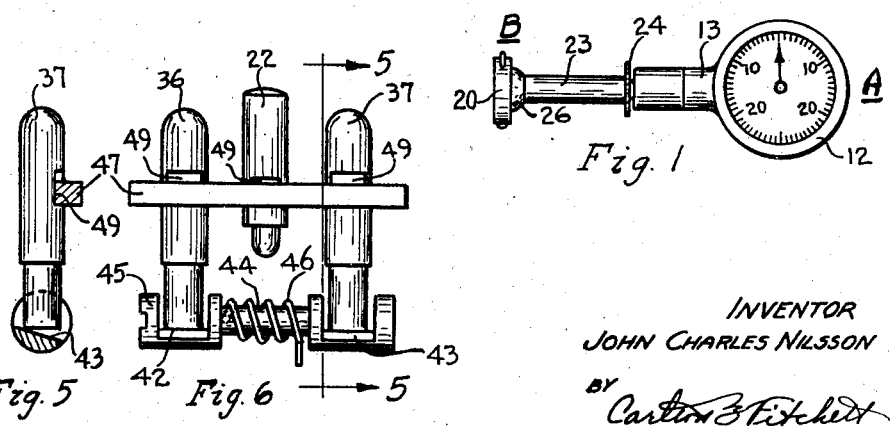
INVENTOR
JOHN CHARLES NILSSON
BY Carlton B Fitchett
AGENT Patented July 22, 1947

2,424,497

UNITED STATES PATENT OFFICE 2,424,497

BORE GAUGE

John Charles Nilsson, Hyde Park, N. Y., assignor to Nilsson Gage Company, Inc., Poughkeepsie, N. Y.

Application November 19, 1945, Serial No. 629,455

8 Claims. (Cl. 33—178)

This invention relates to an improved inside diameter measuring and indicating gauge of a style and type particularly designed for diameter gauging of holes ranging from ⅛ to 1 inch.

It is an object of the invention to provide a gauge head construction having incorporated therein improved feeler pin projecting means for positioning the head in a gauging position in a bore.

It is another object of the invention to provide an easily accessible releasing and locking means for adjustably mounting a fork-equipped diameter varying adapter member in an operating position on the head of this improved gauge.

A further object of the invention is to provide a head for instruments in this category, the construction of which will possess such structural features as to make for ease in manufacture and assembly and at the same time, retain the ability to promote precision use by machinists and the like.

Other features and advantages will become more readily apparent from the following description and the accompanying illustrative drawings.

Certain features of construction of my improved bore gauge are found in the patent issued to me September 18, 1945, No. 2,385,157, which discloses a device comprising a hollow tubular stem accommodating a detachable tell-tale indicator on one end, and a slidable but non-rotatable rod passing through the stem and a head containing mechanism for actuating the rod on the other end of the hollow stem. The construction herein described differs essentially from that of my prior patent in respect to features particularly adapted to manufacturing purposes, and accordingly, no claim is made herein covering any construction common to my improved bore gauge.

In the drawings, wherein like numerals designate like parts throughout the same—

Fig. 1 is a side elevational view of the complete measuring and indicator gauge as constructed in accordance with the principles of this invention.

Fig. 2 is an isometric view of the component parts of the gauge head with the parts spread out along a common center-line to show their manner of assembly.

Fig. 3 is a fragmentary longitudinal sectional view, with certain parts in elevation, taken along line 3—3 of Fig. 4.

Fig. 4 is a like view taken along line 4—4 of Fig. 3.

Fig. 5 is a side elevational view of the feeler and indicator actuator pin travel limiting arrangement, with certain parts in section, taken along line 5—5 of Fig. 6.

Fig. 6 is a bottom plan view of the said travel limiting arrangement.

Fig. 7 is an isometric view showing the assembly of the hollow stem and the projectable but non-rotatable gauge actuator rod.

Referring now to Fig. 1, it will be seen that the complete gauge is characterized by two main components; namely, a detachable dial equipped gauge-indicator A, as for instance of the type disclosed in an application filed by me on April 12, 1945, Serial No. 588,021, or other tell-tale device and a diameter gauging head B which is the specific subject matter of this application.

Considering first the part A, which may be of a type as shown in application Serial No. 588,021, which is now abandoned, and comprises in general, a gauging dial and casing arrangement 12 with an extension 13 having a reduced terminal portion 14 equipped with a headed plunger 15 to operate the dial mechanism, as shown in Figure 3. The parts 14 and 15 are fitted into a socket 16 of the hollow stem 17 which in turn is fitted telescopically into socket 18 in an extension 19 on one face of the inside diameter gauging head, part B.

As previously indicated the head portion, generally indicated at B, contains the diameter measuring and gauging mechanism. As shown in Fig. 3, the head has a bore or socket 18 extending throughout the externally threaded extension portion 19 and continuing into the head body 20 to a point below the intersection of the bore 21 containing the double-studded transverse indicator actuating pin 22. A tubular sleeve 23 is arranged on the outside of stem 17 and has an enlarged knurled band portion 24 on one end to facilitate manual operation and an internally threaded reduced diameter portion 25 on the other end. The threaded portion 25 coacts with the threaded hollow extension 19 on the head to lock or release, through the means of ring 26, the L-shaped adapter unit generally indicated at 27. As shown in Figures 2 and 3, adapter unit 27 is provided with a fork whose arms 28 and 29 fit in slots 30 and 31 in the head 20. The peripheral portion of the head 20 is formed with a groove 32 on one side to accommodate the projectable and retractable limb portion 33 of the adapter. A spring 34 is provided between this part and the base of groove 32 to urge the adapter unit in an outward direction. This part 33 is also provided with a pin 35 which functions as a fixed feeler element for the head. In this way, the adapter thus adjustably mounted in projectable and retractable position on the head, permits the effective diameter of the head to be increased or decreased for adjusting and increasing the utility of this part.

In addition to the adapter attachment 27 being radially projectable and retractable, the feeler pins 36 and 37 are likewise mounted for adjustment. This arrangement is particularly brought out in Figures 4, 5 and 6. As shown in Figure 4, the feeler pins 36, and 37 are contained in transverse bores in the head body 20 in the same plane with the indicator actuating pin 22 and are arranged one on each side thereof and substantially diametrically opposite pin 35 on the adapter unit 27. The inner end of the indicator actuating pin 22 projects into the area of socket 18 in the head body 20 and coacts with the tapered reduced inner end 38 of the projectable gauge actuator rod 39. It is to be noted that the hollow stem 17 is slotted at its lower end to accommodate the passage therethrough of the tapered reduced inner end 38 of the projectable gauge actuator rod or pin 39 (see Figure 7). This part 39 is slidably mounted in the hollow stem 17, but is prevented from rotation in the complete assembly by the extension of the taper cam end 38 through slot 40 at the base of stem 17. A further transverse bore 41 (see Figure 4) is arranged at right angles but in the same plane as the bores containing the feeler pins 36 and 37 and contains a rod having two similar cam surfaces 42 and 43 so arranged as to abut the inner ends of feeler pins 36 and 37 respectively, and a reduced diameter portion 44 therebetween encircled by a coil spring 46 and a slotted head portion 45 on one extreme end. The spring 46 surrounding the reduced diameter portion 44, is affixed to the rod at one end and to the head body 20 at the other end and tends to rotate the rod in such a direction that the similar cam surfaces 42 and 43 exert a force to urge the feeler pins 36 and 37 in an outward direction at all times. When the gauge is assembled, the tension of the spring is fixed by the number of turns given to the rod through the medium of the slotted head portion 45. For the purpose of holding all the pins in the final assembled relation and limiting their lengthwise travel outwardly from the head body 20, a bar 47 is pressed into a slot 48 in the under side of the head body 20 transverse to the bores containing the pins in such a position as to partially intersect the said bores and coacts with notches 49 in the pins as shown.

For the purposes of refining the general appearance of the completely assembled gauge, a cap member 50 is provided with circumferentially spaced apertures to permit projection therethrough of the feeler pins 36 and 37 and the movable feeler pin 22. It is to be noted that the feeler pins 36 and 37 are movable as a unit against the spring 46 through the means of cams 42 and 43. The actuator pin 22 is relatively movable to the unit action of the feeler pins and constitutes the means for exerting an inward cam stress pressure against the cam end 38 of the gauge operating rod 39. Consequently, we have a pair of feeler pins 36 and 37 on one side with a cam actuating pin 22 therebetween and a diametrically opposite feeler pin 35 on the adapter device 27, all of these parts being carefully chosen and selected to bring about the various results desired by the user.

In the operation of this improved inside diameter bore gauge, the diameter varying adapter member is fixed at such an over all distance between the extremities of the fixed feeler pin 35 and the movable feeler pins 36 and 37 as to freely enter the hole to be gauged. The head of the instrument is then placed in the hole and the knurled ring 24 on sleeve 23 turned to loosen locking pressure through ring 26 on the fork arms 28 and 29 of the adapter member 27. Spring 34 will then force the adapter member limb 33 outwardly until all three feeler pins engage the side walls of the bore thereby positioning the head in a gauging position in the bore. The adapter member 27 is then locked in position by turning the knurled ring 24 thus clamping ring 26 down on the fork arms 28 and 29 of the adapter. Actuator pin 22 also will engage the side wall of the bore to be gauged and any variance of diameter of the bore will therefore vary the overall length between the outer end of pin 35 and the outer end of pin 22 which will result in movement of pin 22 to accommodate the variance and that motion being imparted to gauge operating rod 39.

It is to be noted that gauge operating rod 39 (see Figure 3) coacts with the plunger 15 and thereby operates the dial mechanism. Therefore, the parts A and B thus combined serve aptly and adequately for the inside bore diameter measurement and dial indicating purposes. It is thought unnecessary, however, beyond the foregoing description of the use of the adapter unit control means, to illustrate or describe further various examples because inside gauges are well known and methods of use vary slightly depending on the different jobs encountered, and the modes of procedure and technique pursued by the different users. It is thought that persons skilled in the art to which the invention relates will be able to obtain a clear understanding of the invention after considering the description in connection with the drawings.

I claim:

1. In an inside diameter bore gauging instrument including a circular head, an indicator and a gauging pin in said head operatively related to said indicator, the said head being positionable in a gauging position in a bore by a plurality of projectable feeler pins mounted in the same plane, the improved pin projecting means comprising a rotatable bar mounted in said head, in the same plane and at right angles to the inner ends of the said feeler pins, an individual cam formed on said bar in operable relation to the inner end of each feeler pin and a single-spring means adapted to rotate the said bar.

2. In an inside diameter bore gauging device including a circular head, an indicator, a gauging pin in said head operatively related to said indicator, and a plurality of circumferentially spaced projectable feeler pins mounted in the same plane in a predetermined zone of the peripheral portion of said head and extending from within the head, through and beyond the perimeter of the head, the improved pin projecting means comprising a single-spring actuated rotatable rod mounted transversely in the head at right angles in the same plane with and adjacent to the inner ends of the said feeler pins and a plurality of cams on the said rod, each cam being individual to and coacting with the inner end of a feeler pin, the said inner ends of the feeler pins being so constructed as to operatively engage their respective cams.

3. In an inside diameter bore gauging device as set forth in claim 2, means limiting the length of travel of the said projectable feeler pins, comprising a transverse bar mounted in said head at right angles and substantially in the same plane with and partially intersecting a portion of each of the said feeler pins within the body of the head, an elongated coacting notch in each of the said feeler pins at the locus of intersection, the said bar passing through the said notches in an operative relation therewith whereby the length of travel of the pins is limited to the length of the notch less the thickness of the bar in the notch.

4. In an inside diameter bore gauging device, a one piece head construction as a component part thereof comprising a circular block having a centrally located hollow circular externally threaded extension on one face thereof, a longitudinally extending groove on the periphery thereof, transverse parallel slots extending from the longitudinally extending groove substantially diametrically across the one face of the said head, one on each side of the said extension, a longitudinally extending hole in said head forming a continuation of the hollow center of the said extension, a plurality of transverse holes through said head extending inwardly from the periphery of the head in a predetermined zone substantially diametrically opposite from the said longitudinally extending groove, a second plurality of transverse holes extending through said head at right angles to the first plurality of holes, at least one of the first plurality of holes intersecting and terminating in the central longitudinal hole, and at least two of the first plurality of holes intersecting and terminating in the one of the second plurality of holes most remote from the peripheral point of beginning of the first plurality of holes, and at least one of the second plurality of holes partially intersecting at least three of the first plurality of holes at a point between the central longitudinal hole and the peripheral point of beginning of the first plurality of holes.

5. In an inside diameter bore gauging device including a circular head having a tubular projecting portion, an indicator, a gauging pin in said head operatively related to said indicator, the said head being positionable in a gauging position in a bore by a plurality of projectable feeler pins mounted in the same plane, a diameter varying adapter comprising a fork and a limb at right angles thereto mounted on said head and operatively related to said head, and a hollow stem affixed to and extending between said indicator and said head, means adapted to project said feeler pins comprising a rotatable bar mounted in said head in the same plane and at right angles to the inner ends of the said feeler pins, an individual cam formed on said bar in operable relation to the inner end of each feeler pin and a single-spring means adapted to rotate the said bar, and means mounted on said hollow stem and operatively related to said head adapted to releasably engage said head and the fork of said adapter in a fixed relation, said means comprising a sleeve surrounding said hollow stem and having an enlarged diameter portion on the end remote from the head and a reduced diameter portion coacting with said tubular projecting portion of the head on the end adjacent to the said head.

6. In an inside diameter bore gauging device of the class described, the combination of a one piece head provided with a centrally located hollow circular externally threaded extension on one face thereof and a longitudinally extending hole in said head forming a continuation of the hollow center of the said extension, a plurality of circumferentially spaced projectable feeler pins mounted in a predetermined zone of the peripheral portion of said head and extending from within the head, through and beyond the perimeter of the head, coacting spring and cam means for radially projecting the said feeler pins, a slidably adjustable double-studded gauging pin mounted in the head between the said feeler pins and extending through and beyond the peripheral portion of the head on one end and the other end extending into the said longitudinal hole, an indicator means, a hollow stem connecting the circular hollow extension of the head and indicator means, a slidably operable but non-rotatable rod mounted in said hollow stem having a cam element on one end extending into said longitudinal hole and engaging with the inner studded end portion of the double-studded gauging pin and the other end engaging the operating mechanism of the indicator means, a spring projectable diameter varying adapter comprising a fork and a limb at right angles thereto mounted on one face of the head and means surrounding said hollow stem and operatively related to said head for releasably engaging said head and the fork of said adapter in a fixed relation comprising a rotatable internally threaded sleeve mounted on the said hollow stem and coacting with screw threads on the hollow circular extension of the said head, said sleeve having a shoulder thereon, and a ring mounted on said sleeve of such length as to extend substantially between said shoulder and the fork of the said diameter varying adapter mounted on said head.

7. In a diameter gauging device including a circular head having a tubular projecting portion, an indicator, a gauging pin in said head operatively related to said indicator, a hollow stem affixed to and extending between said indicator and said head, and a diameter varying adapter comprising a fork and a limb at right angles thereto mounted on said head and operatively related to said head for positioning said head in a gauging position in a bore, means mounted on said hollow stem and operatively related to the tubular projecting portion of said head adapted to releasably engage said head and the fork of said adapter in a fixed relation.

8. In a diameter gauging device as set forth in claim 7 wherein the releasably engaging means comprises a sleeve surrounding said hollow stem and having an enlarged diameter portion on the end remote from the head and a reduced diameter portion coacting with said tubular projecting portion of said head on the end adjacent to said head, a shoulder on said sleeve, and a ring surrounding said end of the sleeve adjacent to said head, said ring being of such a length as to extend substantially between the fork of the said diameter varying adapter mounted on said head and said shoulder.

JOHN CHARLES NILSSON.

REFERENCES CITED

The following references are of record in the file of this patent:

UNITED STATES PATENTS

| Number | Name | Date |
|---|---|---|
| 1,431,616 | Wittner | Oct. 10, 1922 |
| 2,095,405 | Aldeborgh et al. | Oct. 12, 1937 |
| 2,385,157 | Nilsson et al. | Sept. 18, 1945 |
| 2,016,657 | Tydeman | Oct. 8, 1935 |